United States Patent [19]
Park

[11] Patent Number: 6,163,299
[45] Date of Patent: Dec. 19, 2000

[54] WIRELESS LOCAL LOOP SYSTEM USING PATCH-TYPE ANTENNA

[75] Inventor: Yong-Pal Park, Gumi, Rep. of Korea

[73] Assignee: Hyundai Electronics Industries Co., Ltd., Kyoungki-do, Rep. of Korea

[21] Appl. No.: 09/244,089

[22] Filed: Feb. 4, 1999

[30]  Foreign Application Priority Data

Feb. 7, 1998 [KR] Rep. of Korea ............... 98-3575

[51] Int. Cl.[7] ........................................ H01Q 1/38

[52] U.S. Cl. ..................... 343/700 MS; 343/844

[58] Field of Search ................. 343/702, 700 MS, 343/890, 872, 844, 841; 455/562

[56]  References Cited

U.S. PATENT DOCUMENTS

| | | | |
|---|---|---|---|
| 4,937,585 | 6/1990 | Shoemaker | 343/700 MS |
| 5,625,369 | 4/1997 | Newman | 343/872 |
| 5,661,494 | 8/1997 | Bondyopadhyay | 343/700 MS |
| 5,905,467 | 5/1999 | Narayanaswamy et al. | 343/702 |

*Primary Examiner*—Tan Ho

[57]  ABSTRACT

The present invention relates to a wireless local loop (WLL) system using a patch-type antenna which is provided with microstrips and can be installed indoors. In a WLL system wherein there are provided a base station for relaying transmitted/received signals and a terminal for exchanging these signals between the base station and a telephone or a modem. The present invention includes a patch-type antenna that is detachable/connectable from/to the terminal.

21 Claims, 4 Drawing Sheets

WIRELESS LOCAL LOOP SYSTEM USING PATCH-TYPE ANTENNA

BACKGROUND OF THE INVENTION

1. Field of the Invention

The present invention relates to a wireless local loop (WLL) system, and more particularly to a WLL system having a patch-type antenna which is detachable/connectable from/to a terminal.

2. Description of the Background Art

The WLL system is a system which employs radio frequency waves, and makes communication possible without using telephone land-lines exclusively.

FIG. 1 is a block diagram of a general WLL system provided with a base station 10 for relaying transmitted/received signals and a plurality of terminal systems 12a–12m for inputting/outputting signals, which are transmitted/received to/from the base station 10, to/from a telephone or a modem.

Here, the base station 10 is established at a highly elevated outdoor area, and the terminal systems 12a–12m are located in each house or office.

The operation of the conventional wireless local loop system will now be described.

When signals from the base station 10 are transmitted into the air through an antenna 1, the terminal systems 12a–12m receive the transmitted signals via their antennas 2 and users receive the signals through devices such as the telephone or the modem. Similarly, the terminal systems 12a–12m transmit signals from the telephone or the modem to the base station 10 through the antennas 2 provided therein.

As shown in FIG. 2, a terminal 12 is located at an outer wall of a building and connected to the telephone or the modem inside the building through a separate telephone line, and a rod-type antenna 2 is formed with the terminal 12 as a single unit.

Accordingly, since the conventional antenna 2 is attached to the terminal 12 as the single unit and disposed at the outer wall of the building, it is, e.g., difficult to install the antenna in case of a multistoried building.

SUMMARY OF THE INVENTION

An object of the present invention is to provide a wireless local loop system that substantially obviates at least one of problems or disadvantages of the conventional art.

Another object of the present invention is to provide a wireless local loop system capable of being installed indoors and capable of permitting an antenna to be separated from a corresponding terminal.

To achieve at least the above-described objects in a whole or in parts, there is provided a wireless local loop system according to the present invention that includes a base station for relaying transmitted/received signals, a terminal system for inputting/outputting signals, which are transmitted/received to/from the base station, to/from a local communications device such as a telephone or a modem, and a patch-type antenna which is detachable/connectable from/to a terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide and further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE INVENTION

Figure 1:
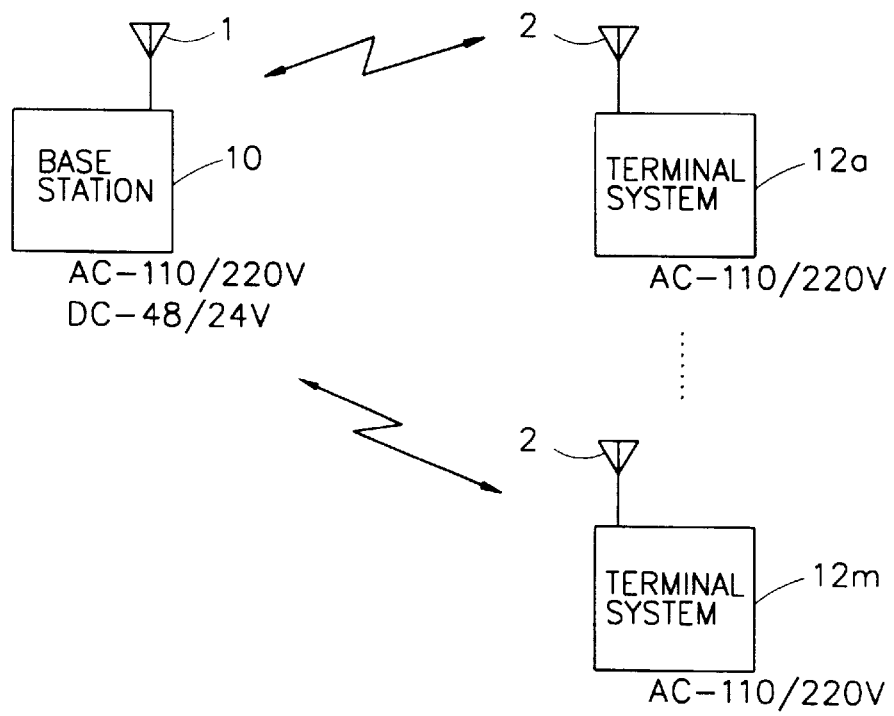
FIG. 1 is a block diagram of a conventional wireless local loop system.
Figure 2:
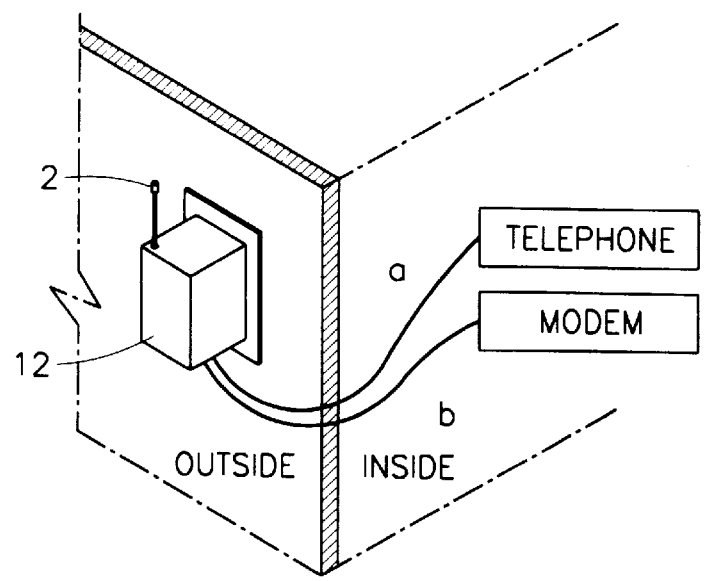
FIG. 2 is a simplified schematic diagram illustrating a terminal and an antenna according to the conventional art.
Figure 3:
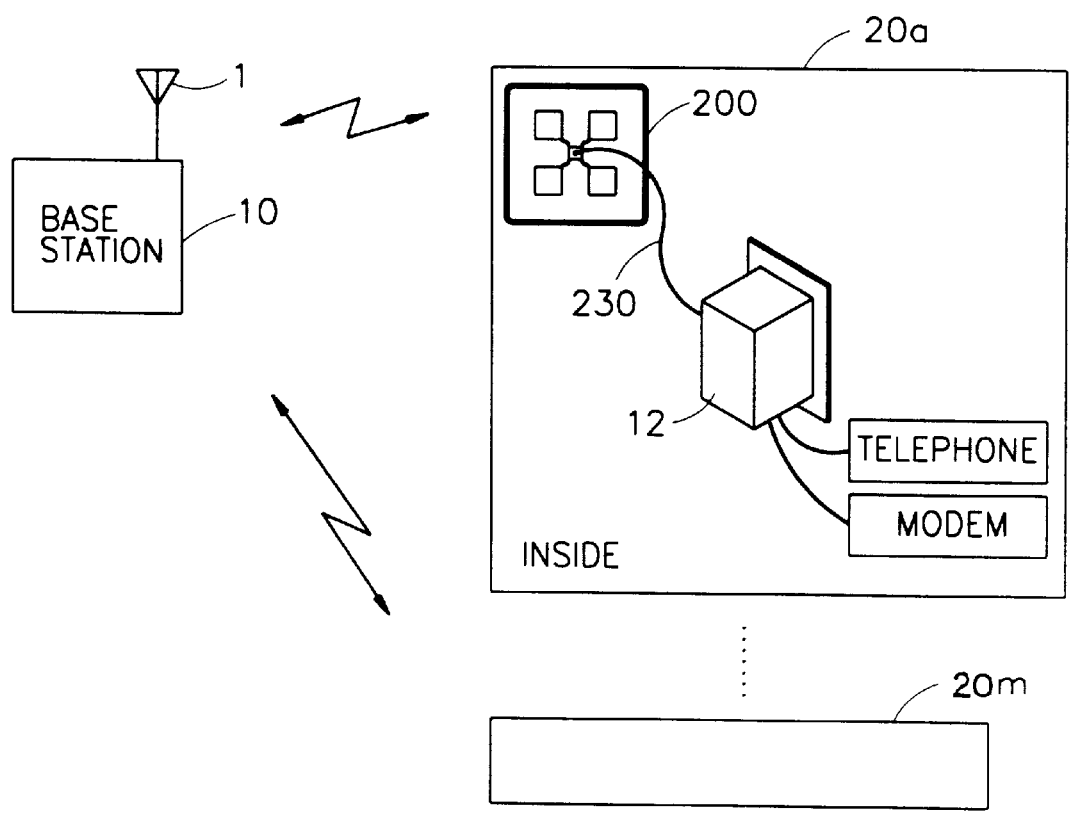
FIG. 3 is a simplified schematic diagram illustrating a terminal and a patch-type antenna according to the present invention.

As shown in FIG. 3, in a wireless local loop (WLL) system provided with a base station 10 for relaying transmitted/received signals and a plurality of terminal systems 20a–20m for inputting/outputting signals to/from the base station 10. The WLL system according to the present invention includes a patch-type antenna 200 which is detachable/connectable from/to a terminal 12. Here, the elements which are the same as those of the conventional art are labeled with the same reference numbers.

Figure 4:
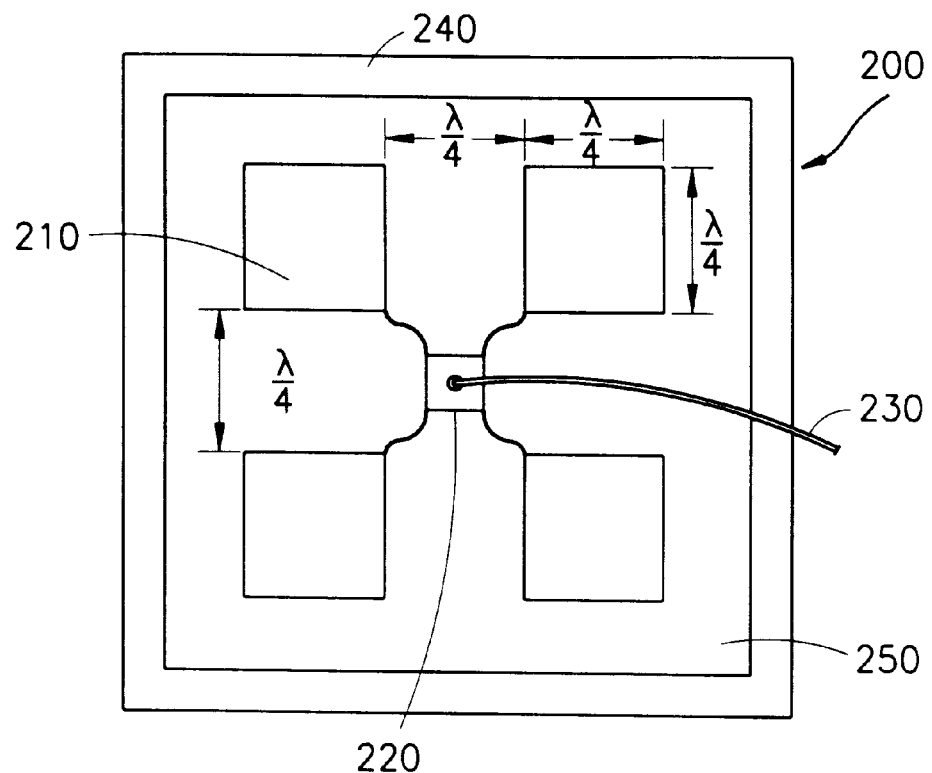
FIG. 4 is a detail construction diagram of the patch-type antenna in FIG.3.

As shown in FIG. 4, the patch-type antenna 200 includes: a plurality of metal-plate microstrips 210; a transmitting-receiving port 220 for connecting the microstrips 210 to each other; a service line 230 for connecting the transmitting-receiving port 200 to the terminal 12 and transmitting signals therebetween; a guard ring 240 for protecting the microstrips 210; and a transparent panel 250 to which the microstrips 210, the transmitting-receiving port 220, and the guard ring 240 are attached.

Figure 6:
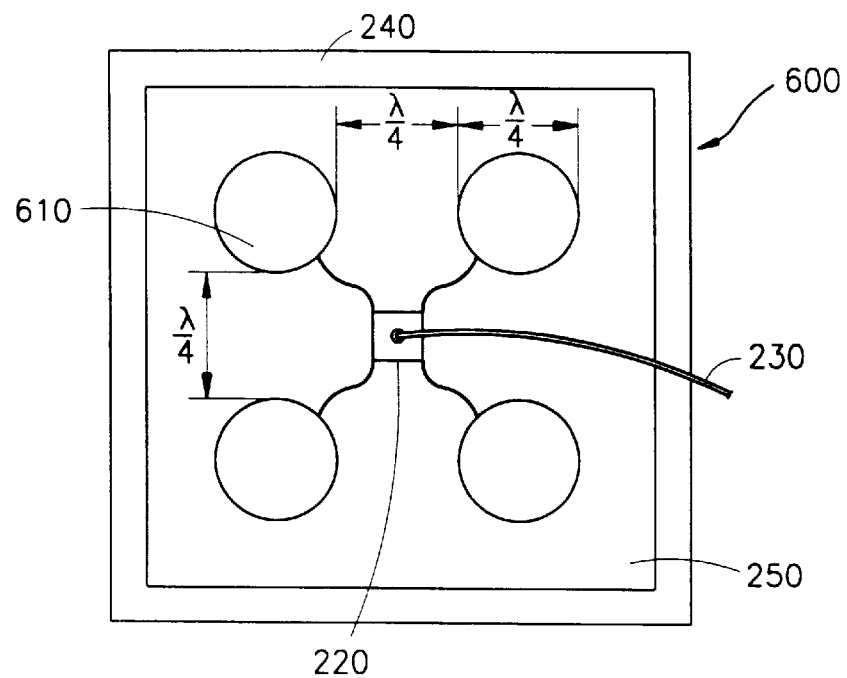
FIG. 6 illustrates an alternative configuration of the patch-type antenna according to the present invention.

Each of the metal-plate microstrips 210 is shaped as a square (as in FIG. 4) or an equilateral triangle (as in FIG. 7) or a disk (circle) (as in FIG. 6). Each side of the square metal-plate microstrip 210 is preferably one-quarter of the desired wavelength, i.e., $\lambda/4$, in length. The center-to-center distance between neighboring plates 210 preferably is $\lambda/2$. The plates 210 are preferably spaced evenly apart relative to the port 220. The number and thickness of the metal plates are determined in accordance with a desired transmitted/received frequency for reducing manufacturing costs or for the convenience of a user.

Here, a convenient length for each side or diameter of the microstrips 210 is, e.g., $\lambda/4$. Accordingly, when a frequency applied to the general WLL system ranges, e.g., between 2.3 to 2.4 GHz, a desirable length of each side of the microstrips 210 is 3.2 cm±2%.

Specifically, when the frequency is 2.3 GHz, $\lambda = c/f = 3 \times 10^8 / 2.3 \times 10^9 = 13$ cm, $\lambda/4 = 3.26$ cm, and when the frequency is 2.4 GHz,
λ=c/f=3×10⁸/2.4×10⁹=12.5 cm,
λ/4=3.125 cm, thus it is most effective when the length of each side of the microstrips 210 is 3.2 cm±2%.

The guard ring 240 is attached to a marginal space of the transparent panel 250, thus protecting the microstrips 210 and the transmitting-receiving port 220. The size of the transparent panel 250 may vary in accordance with sizes of the microstrips 210. The transmitting-receiving port 220 connected to the microstrips 210 is also connected to the terminal 12 through the service line 230.

Figure 5:
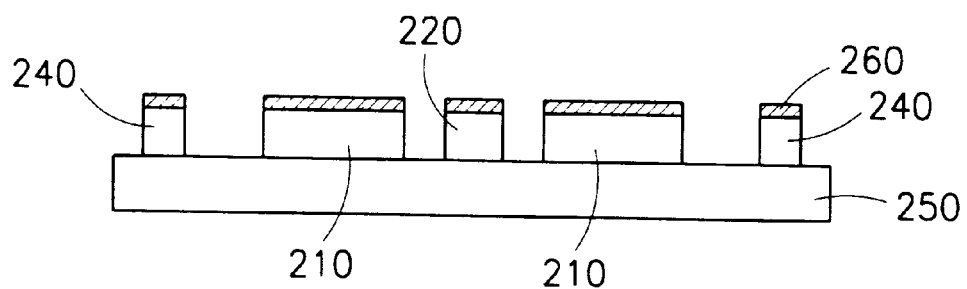
FIG. 5 illustrates a cross-section of the patch-type antenna in FIG. 4.

FIG. 5 illustrates a cross-section of the patch-type antenna 200 according to the present invention. An adhesive 260 is attached to one side of each of the microstrips 210, the transmitting-receiving port 220, and the guard ring 240. As a result, by using the adhesive 260 attached to each of the microstrips 210, the transmitting-receiving port 220, and the guard ring 240, respectively, the patch-type antenna 200 may be easily detached from the terminal 20 and attached to a window or a wall inside the building. Also, the patch-type antenna 200 may be directional toward the base station 10.

In case where the base station 10 transmits signals to the terminal 12, when output signals from the base station 10 are transmitted into the air through the antenna 1, the patch-type antenna 200 installed in a house or an office receives the signals which are transmitted to an apparatus such as the telephone or the modem through the terminal 12. On the other hand, when the terminal 12 transmits the signal to the base station 10, the signal is transmitted in the reverse order.

As noted, FIG. 6 depicts a patch-type antenna 600 having disk-shaped metal-plate microstrips 610 that are evenly distributed around the port 220, and which have a λ/4 diameter. The center-to-center distance of the microstrips 610 is λ/2.

Figure 7:
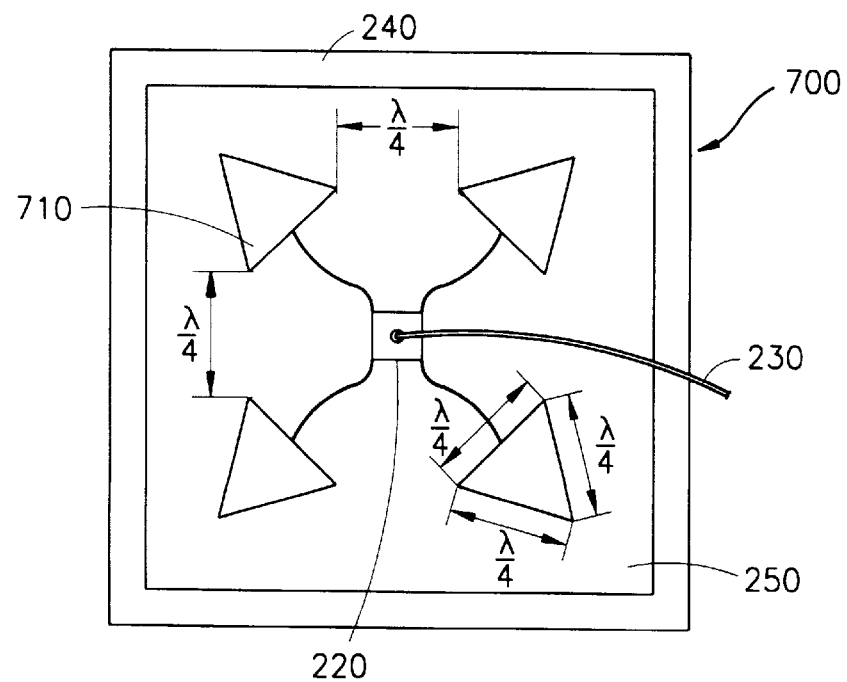
FIG. 7 illustrates another alternative configuration of the patch-type antenna according to the invention.

As noted, FIG. 7 depicts a patch-type antenna 700 having equilateral triangular metal-plate microstrips 710 that are evenly distributed around the port 220, and whose sides have a λ/4 length. Vertices of neighboring microstrips 710 are separated by a distance λ/4.

As described above, in the WLL system according to the present invention, the terminal may be installed inside the building by attaching the patch-type antenna to the window or the inner wall. This can be particularly convenient for a user located in a multistoried building who cannot easily access a highly elevated surface on the outside of such a building.

It will be apparent to those skilled in the art that various modifications and variations can be made in the WLL system using the patch-type antenna of the present invention without departing from the spirit or scope of the invention. Thus, it is intended that the present invention cover the modifications and variations of this invention provided they come within the scope of the appended claims and their equivalents.

What is claimed is:

1. A wireless local loop (WLL) system comprising:
   a base station for relaying transmitted/received signals; and
   a terminal for inputting/outputting signals, which are transmitted/received to/from the base station, to/from a local communications device, said terminal including
   a patch-type antenna, operatively connected to the terminal, arranged as an array of microstrips;
   wherein a center-to-center distance between each microstrip and closest neighboring other ones of said microstrips is λ/2.

2. The WLL system of claim 1, wherein the patch-type antenna further comprises:
   a transmitting-receiving port for connecting the microstrips to each other;
   a service line for connecting the transmitting-receiving port to the terminal and for transmitting signals therebetween;
   a guard ring for protecting the microstrips; and
   a transparent panel to which the microstrips, the transmitting-receiving port, and the guard ring are attached.

3. The WLL system of claim 2, further comprising an adhesive attached to one side of the microstrips, the transmitting-receiving port, and the guard ring.

4. The WLL system of claim 1, wherein each of said microstrips is shaped in a square.

5. The WLL system of claim 1, wherein each of said microstrips is shaped as an equilateral triangle.

6. The WLL system of claim 1, wherein each of said microstrips is shaped as a circle.

7. The WLL system of claim 1, wherein the number of the microscopes are determined in accordance with a desired transmitted or received frequency.

8. The WLL system of claim 1, wherein the patch-type antenna is directional toward the base station.

9. The WLL system of claim 1, wherein the patch-type antenna is mechanically detachable from the terminal or connectable thereto such that said patch-type antenna can be positioned away from said terminal.

10. The WLL system of claim 1, wherein the terminal and the patch-type antenna are respectively installed in a building.

11. The WLL system of claim 1, wherein said local communications device is one of a telephone and a modem.

12. The WLL system of claim 1, wherein said patch-type antenna has at least one of the following attributes: (1) each of said microstrips has the same symmetric configuration for which a side length or diameter is λ/4 and (2) the microstrips are spaced λ/4 apart.

13. A patch-type antenna, for a wireless local loop (WLL) system, arranged as an array of microstrips;
   wherein a center-to-center distance between each microstrip and closest neighboring other ones of said microstrips is λ/2.

14. The patch-type antenna of claim 13, further comprising:
   a transmitting-receiving port for connecting the microstrips to each other;
   a service line for connecting the transmitting-receiving port to the terminal and for transmitting signals therebetween;
   a guard ring for protecting the microstrips; and
   a transparent panel to which the microstrips, the transmitting-receiving port, and the guard ring are attached.

15. The antenna of claim 14, further comprising an adhesive is attached to one side of the microstrips, the transmitting-receiving port, and the guard ring.

16. The antenna of claim 13, wherein each of said microstrips is shaped in a square.

17. The antenna of claim 13, wherein each of said microstrips is shaped as an equilateral triangle.

18. The antenna of claim 13, wherein each of said microstrips is shaped as a circle.

19. The antenna of claim 13, wherein the number of the microstrips are determined in accordance with a desired transmitted or received frequency.

20. The antenna of claim 13, wherein the patch-type antenna is directional toward the base station.

21. The antenna of claim 13, wherein said patch-type antenna has at least one of the following attributes: (1) each of said microstrips has the same symmetric configuration for which a side length or diameter is $\lambda/4$ and (2) the microstrips are spaced $\lambda/4$ apart.

* * * * *